(12) United States Patent
Olsen et al.

(10) Patent No.: US 10,855,137 B2
(45) Date of Patent: Dec. 1, 2020

(54) PUMP UNIT

(71) Applicant: GRUNDFOS HOLDING A/S, Bjerringbro (DK)

(72) Inventors: Michael Egelund Olsen, Silkeborg (DK); Christian Schuldt, Reinfeld (DE)

(73) Assignee: GRUNDFOS HOLDING A/S, Bjerringbro (DK)

( * ) Notice: Subject to any disclaimer, the term of this patent is extended or adjusted under 35 U.S.C. 154(b) by 609 days.

(21) Appl. No.: 14/655,400

(22) PCT Filed: Dec. 12, 2013

(86) PCT No.: PCT/EP2013/076442
§ 371 (c)(1),
(2) Date: Jun. 25, 2015

(87) PCT Pub. No.: WO2014/102068
PCT Pub. Date: Jul. 3, 2014

(65) Prior Publication Data
US 2015/0326093 A1  Nov. 12, 2015

(30) Foreign Application Priority Data

Dec. 27, 2012 (EP) .................................... 12199515

(51) Int. Cl.
*H02K 5/22* (2006.01)
*F04D 25/06* (2006.01)
(Continued)

(52) U.S. Cl.
CPC .............. *H02K 5/22* (2013.01); *F04D 25/06* (2013.01); *H02K 5/225* (2013.01);
(Continued)

(58) Field of Classification Search
CPC .......... H02K 5/22; H02K 5/225; H02K 11/30; H02K 11/33; H02K 11/0094; H02K 9/22; H02K 11/0073; F04D 25/06
(Continued)

(56) References Cited

U.S. PATENT DOCUMENTS

| 4,709,124 A | 11/1987 | Wheeler et al. |
| 5,391,088 A * | 2/1995 | Tomchak ............. H01R 13/621 439/216 |

(Continued)

FOREIGN PATENT DOCUMENTS

| CN | 2155640 Y | 2/1994 |
| CN | 101589237 A | 11/2009 |

(Continued)

OTHER PUBLICATIONS

Definition—Plastic (Year: 2009).*
Definition—Lead (Year: 2009).*

*Primary Examiner* — Essama Omgba
*Assistant Examiner* — Christopher J Brunjes
(74) *Attorney, Agent, or Firm* — McGlew and Tuttle, P.C.

(57) ABSTRACT

A pump assembly has an electrical drive motor arranged in a stator housing (8) and has an electronics housing (18) which is connected to the stator housing (8) and in which at least one circuit board (40) with electronic components is arranged. At least one separate connection element (48; 62), which is designed a plastic shaped part, is arranged on or in the electronics housing (18). The connection element includes a first electrical plug connector (52; 66), connected to a corresponding electrical plug coupling on the circuit board (40), as well as a second electric plug connector (54; 68) connected to the first electrical plug connector (52; 66) via strip conductors (54). The second electric plug connector (Continued)

(54; 68) serves for the electrical connection of a component situated outside the electronics housing (18).

20 Claims, 12 Drawing Sheets

(51) Int. Cl.
    *H02K 11/33*     (2016.01)
    *H02K 11/00*     (2016.01)
    *H02K 11/30*     (2016.01)

(52) U.S. Cl.
    CPC ......... *H02K 11/0094* (2013.01); *H02K 11/30* (2016.01); *H02K 11/33* (2016.01)

(58) Field of Classification Search
    USPC .................................. 361/633; 310/64, 67 R
    See application file for complete search history.

(56) References Cited

U.S. PATENT DOCUMENTS

| | | |
|---|---|---|
| 6,974,351 B1 | 12/2005 | Lauk et al. |
| 7,059,872 B2 | 6/2006 | Tanaka et al. |
| 2003/0039107 A1* | 2/2003 | Modi ..................... H01R 9/226 |
| | | 361/752 |
| 2005/0207914 A1 | 9/2005 | Tupy |
| 2011/0157862 A1* | 6/2011 | Ellegaard ................. H01H 9/02 |
| | | 361/837 |

FOREIGN PATENT DOCUMENTS

| | | | |
|---|---|---|---|
| DE | 44 11 960 A1 | 10/1995 | |
| DE | 199 23 298 C1 | 1/2001 | |
| DE | 10 2005 059941 A1 | 8/2006 | |
| EP | 1239152 A2 | 9/2001 | |
| EP | 1239152 A2 * | 9/2002 | ............. F04B 17/03 |
| EP | 1 586 491 A1 | 10/2005 | |
| EP | 1 947 347 A1 | 7/2008 | |
| EP | 2 500 576 A1 | 9/2012 | |

* cited by examiner

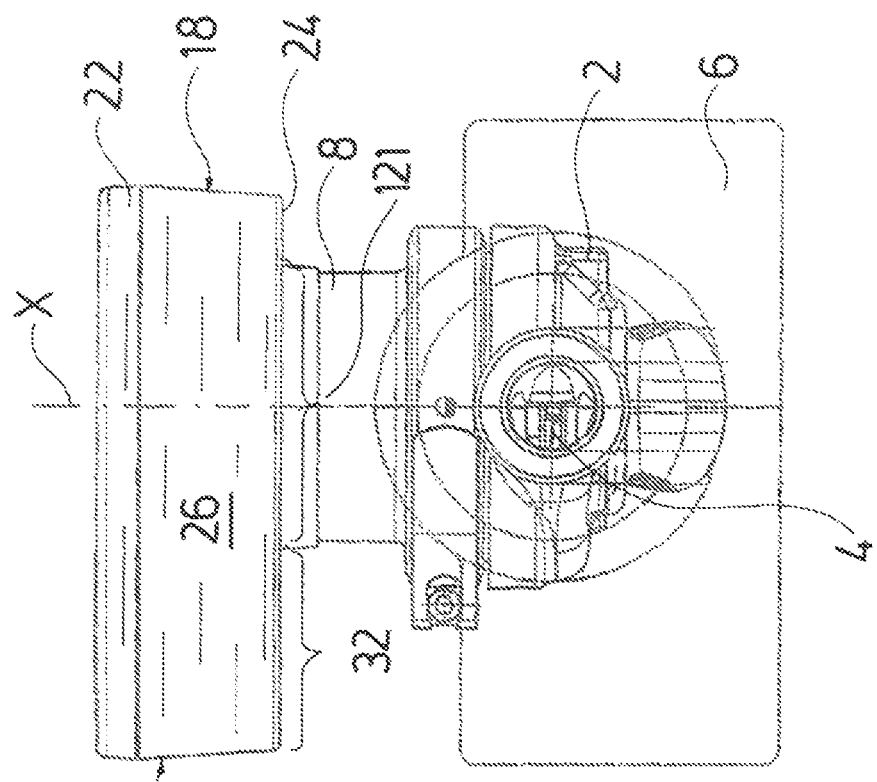

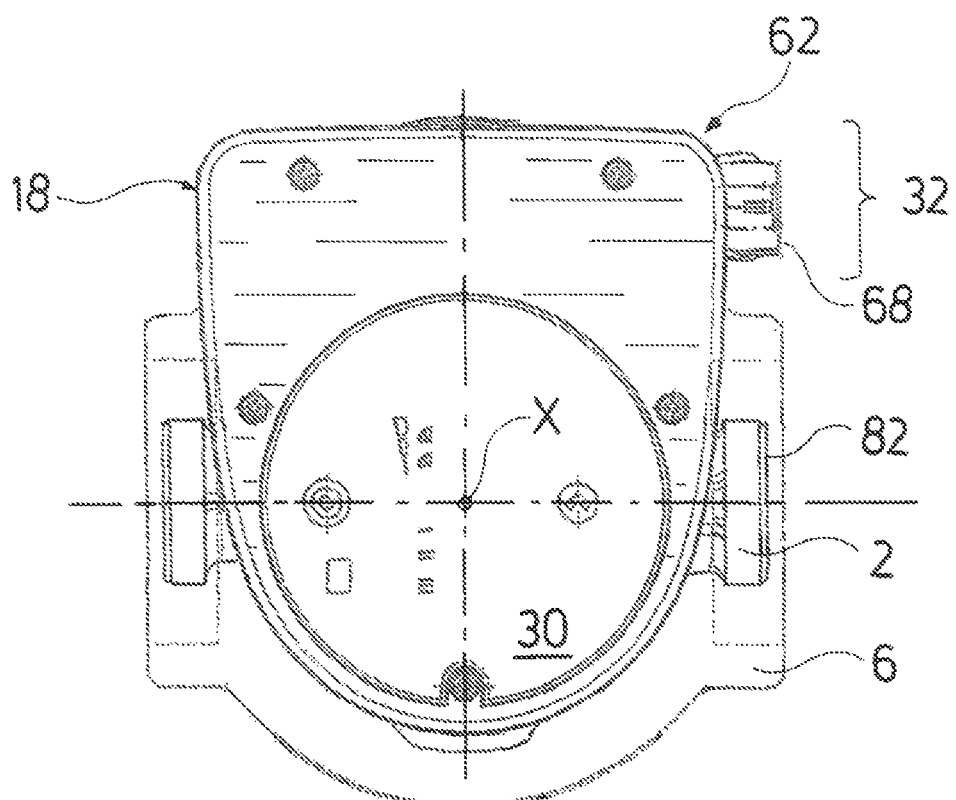

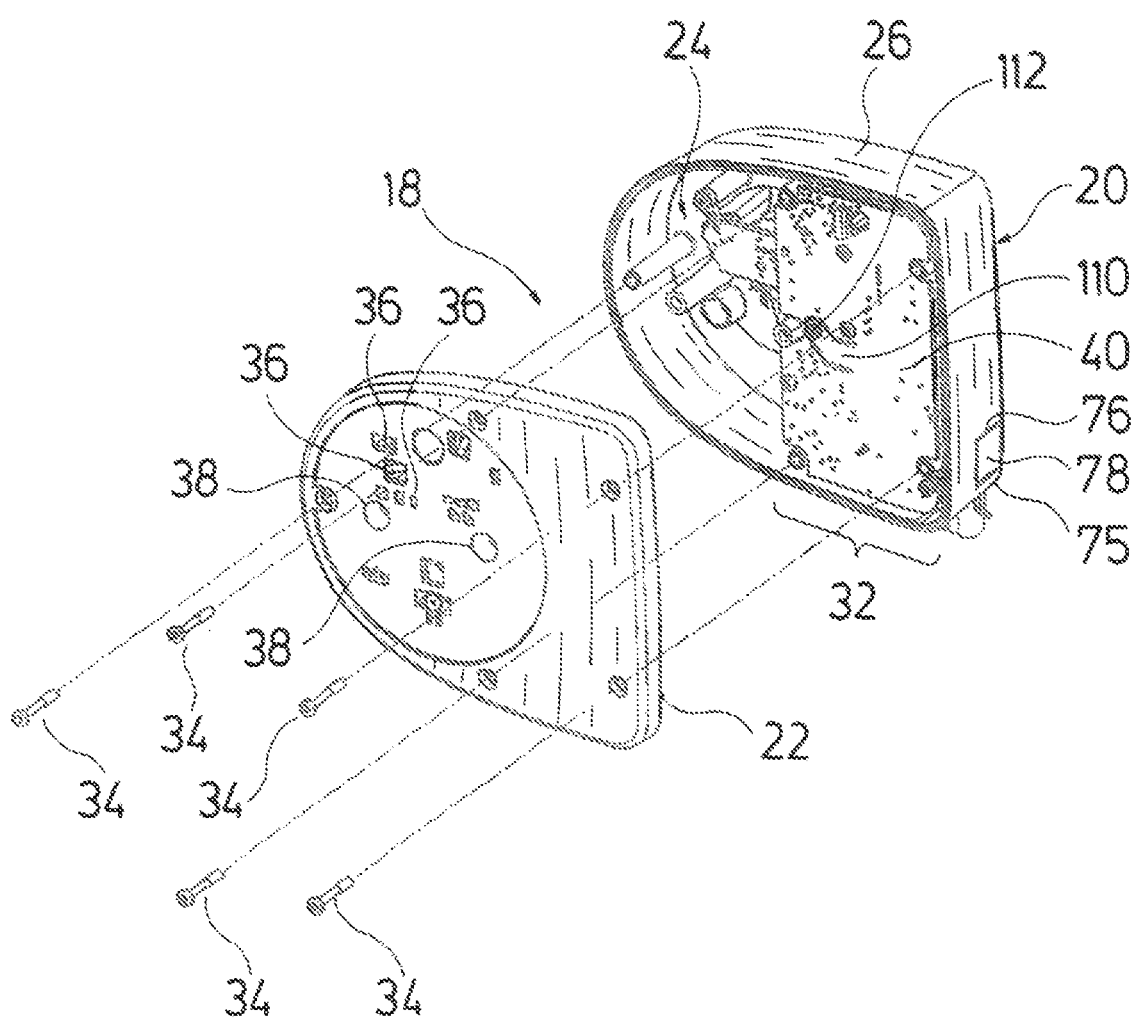

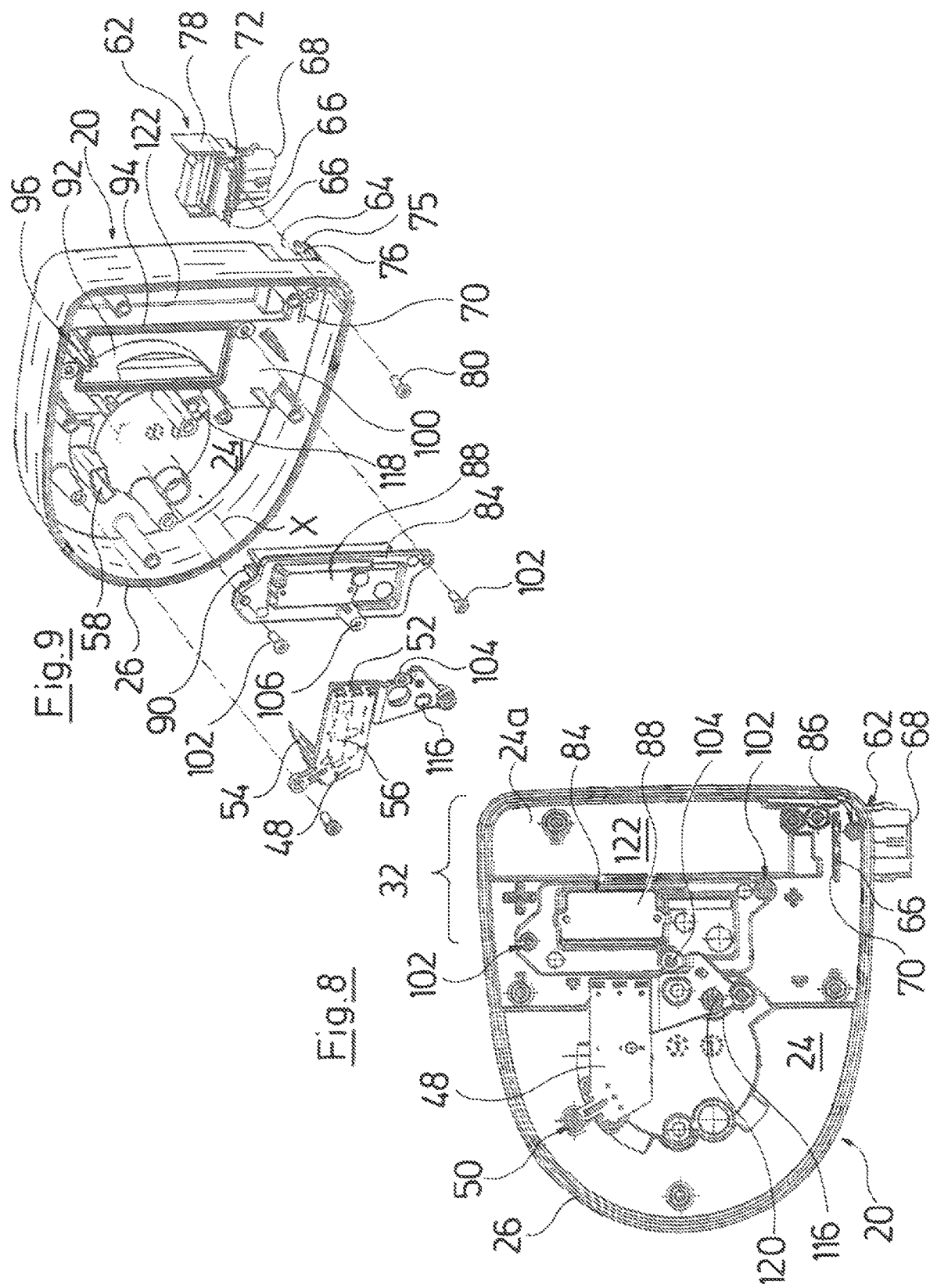

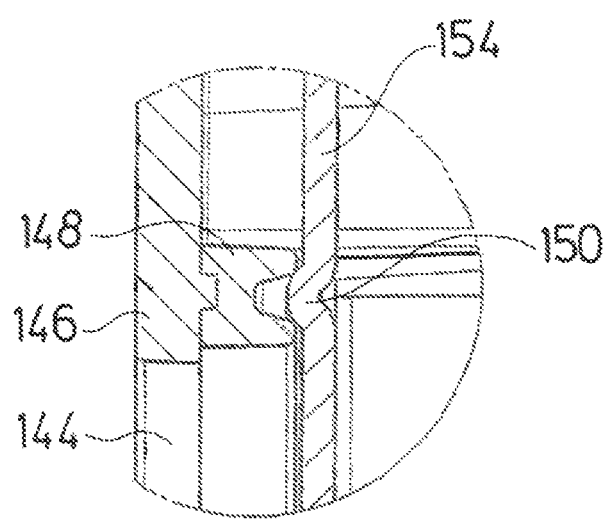
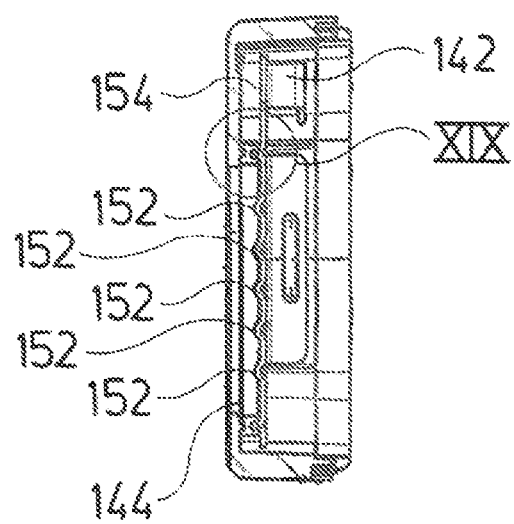

PUMP UNIT

CROSS REFERENCE TO RELATED APPLICATIONS

This application is a United States National Phase Application of International Application PCT/EP2013/076442 filed Dec. 12, 2013 and claims the benefit of priority under 35 U.S.C. § 119 of European Patent Application EP 12199515.3 filed Dec. 27, 2012, the entire contents of which are incorporated herein by reference.

FIELD OF THE INVENTION

The invention relates to a pump assembly with an electrical drive motor arranged in a stator housing and with an electronics housing which is connected to the stator housing and in which at least one circuit board with electronic components is arranged.

BACKGROUND OF THE INVENTION

Pump assemblies such as heating circulation pump assemblies for example, as a rule form a construction unit of an electrical drive motor and a pump, for example a centrifugal pump. The electric drive motor is arranged in a motor housing or stator housing which is connected to the actual pump, i.e. to a pump housing. The electric and electronic components which are necessary for the control or regulation (closed-loop control) of the electric drive motor as a rule are arranged in a terminal box or electronics housing, which is connected to the stator housing.

It is necessary to design connection plug contacts or cable feed-throughs on the electronics housing, for the connection of the coils in the stator housing as well as for the connection of a mains (power/line voltage) connection lead and, as the case may be, for the connection of further electronic components. For this, it is known to mold electrical strip conductors into the plastic material, from which the electronics housing is manufactured, which however renders the molding procedure of the electronics housing complicated. Alternatively, it is possible to provide cable feed-throughs in the housing, through which cables are led, and to connect these cables then in the inside to a circuit board, on which the electronic components are arranged. This in turn demands a complicated assembly which is prone to errors. Moreover, it is problematic to seal off the cables in the cable feed-throughs.

SUMMARY OF THE INVENTION

With regard to these problems, it is an object of the invention to improve a pump assembly to the extent that external electrical or electronic components can be securely connected in a simple manner to a circuit board in the inside of an electronics housing of the pump assembly.

The pump assembly according to the invention in the known manner comprises a motor housing or stator housing, in which the electrical drive motor of the pump assembly, i.e. in particular the stator with its coils and the rotor rotating therein, is arranged. In the known manner, a pump housing, in which preferably at least one impeller rotatingly driven by the electrical drive motor is arranged, is connected to the stator housing. The electronic components which are necessary for the control and regulation of the drive motor are arranged on at least one circuit board which is arranged in a terminal box or electronics housing. This electronics housing is connected to the stator housing. Thereby, it can be applied onto the stator housing, at the axial side or radial side.

According to the invention, at least one separate connection element is arranged in or on the electronics housing. This connection element serves for electrically connecting the circuit board to components situated outside the electronics housing, for example to the coils in the stator housing or to a mains connection lead. The separate connection element is designed as a plastic shaped part and is connected to the remaining structure of the electronics housing, preferably with a non-positive and/or positive fit, as the case may be by way of additional fastening elements such as screws. I.e. the connection element is a component which is independent of the electronics housing. The connection element comprises a first electrical plug connector which is connected to a corresponding plug coupling on the circuit board. This plug connector and the plug coupling are designed such that they can be stuck together in a preferably releasable manner and create an electrical contact by way of sticking together. Moreover, the connection element comprises a second electric plug connector which is connected to the first electrical plug connector via strip conductors. These strip conductors are particularly preferably molded into the plastic of the connection element. The second plug connector serves for creating an electrical connection to a component situated outside the electronics housing. The connection element has an intrinsically stable structure and therefore in contrast to a cable has a defined shape and position.

On account of the additional connection element, it is no longer necessary to mold strip conductors into the electronics housing or its walls themselves. According to the invention, the electronics housing is preferably free of such integrated conductors. Despite this, a simple connection of components situated outside the electronics housing is possible by way of pure plug connections, by which means a simple assembly is realized. Simultaneously, it is not necessary to connect the external components, such as a mains connection lead for example, in a direct manner to plug contacts on the circuit board. This on the one hand has the advantage that the circuit board does not necessarily have to be placed such that it is directly contactable from the outer side of the electronics housing. Thus, more freedom results with the design of the electronics housing and the arrangement of the circuit board in the inside of this housing. On the other hand, it is advantageous that with the connection of external components, it is indeed not plug contacts on the circuit board which need to be contacted, so that damage to the circuit board given an incorrect handling can be prevented. Moreover, a better sealing of the electronics housing to the outside is possible, since one can carry out such a sealing with respect to the shape-stable additional connection element which can be designed as a plastic shaped part, such that it can be led through an opening in the wall of the electronics housing in a well sealed manner or can be placed on such an opening in a sealed manner.

It is to be understood that the first and the second plug connector can be designed as a male or female part of a plug coupling. Accordingly, the plug coupling on the circuit board is designed accordingly as a female or male part of a plug coupling.

Particularly preferably, the connection element is designed as a mains connection element, i.e. it serves for the mains connection of the electronic or electrical components in the inside of the electronics housing and thus preferably for the electricity supply of the complete pump assembly.

This mains connection element comprises a first electric plug connector which is electrically conductively engaged with a corresponding plug coupling on the circuit board, as well as a second electrical plug connector which via electrical strip conductors in the mains connection element is connected to the first plug connector and is envisaged for the connection of a mains connection lead. Thus, the second plug connector can for example be designed as a plug coupling, into which a connection plug of a mains connection lead can be inserted. Depending on the design of the second electric plug connector, the connection plug can be designed as a male or female part of the plug connection. Thus, a simple mains connection of the pump assembly is possible without a complicated screwing-on or clamping-on of the individual conductors.

Particularly preferably, the connection element is arranged outside the interior of the electronics housing. This has the advantage that the second electric plug connector can thus be situated outside the electronics housing and there can be easily contacted for example for the connection of a mains connection lead. The second electrical plug connector can thus for example also engage into the inside of the stator housing, in order there to create the electric contact to the coils of the electrical drive motor. With this arrangement, the first electrical plug element preferably engages into the inside of the electronics housing and contacts the plug coupling on the circuit board.

The interior of the electronics housing is preferably delimited by a wall, in which an opening is formed and through which opening the connection element extends with its first plug connector into the interior. Thus, the first connection element can be arranged at the outside on the electronics housing and extend through the opening into the inside of the electronics housing and there, with the first plug connector, contact the circuit board.

The arrangement of the connection element on the outer side thereby has the advantage that the necessary passage in the wall of the electronics housing can thus be sealed off in a very simple manner. Moreover, the assembly is favored, since the circuit board can be inserted into the inside of the electronics housing and the connection element can then be applied from an opposite outer side and be contacted through the opening with the circuit board. This favors very simple joining procedures.

The second plug connector is preferably arranged outside the interior. This has the advantage that one does not need to intervene in the interior of the electronics housing at all, and this can remain sealingly closed when connecting external components such as a mains connection lead for example. Thus, a malfunctioning of the sealing and the danger of unintended damage to electronic components in the inside of the electronics housing are prevented.

Usefully, a seal is provided which sealingly bears on the wall surrounding the opening, as well as on the connection element, and is preferably molded onto the wall or the connection element. Thus, a sealing of the opening between the connection element and the wall of the electronics housing is created. The molding-on of the seal can preferably be effected with two-component injection molding, wherein the seal then preferably can be applied simultaneously with further necessary seals, for example a seal for sealing a cover applied onto the electronics housing.

According to a preferred embodiment, the first and the second plug connection are angled to one another, preferably at an angle of 90° to one another. In this manner, the connection element can assume a further function in the manner of an adapter. Thus, the connection element has the advantage that the plug-in direction for the connection of an external component, such as a mains connection lead, is not given by the arrangement of the circuit board and the plug coupling placed there, but can be directed in another direction with the help of the connection element, so that the second plug connector can be placed such that it is well assessable for example from the outside, in order to apply a mains connection lead.

Alternatively, the second plug connector can be arranged such that it can engage into the stator housing, and there can contact connection contacts of the electrical coils of the stator. Thus, the connection element permits more freedom with regard to the fashioning of the electronics housing.

The circuit board extends in the interior of the electronics housing, preferably parallel to a base of the electronics housing, and the second plug connector is directed to a side wall of the electronics housing which extends transversely to the base. Particularly preferably, the side wall extends normally to the base.

The arrangement of the second plug connectors on the connection element at an angle of 90° to one another has the advantage for example that the circuit board can be aligned parallel to the base of the electronics housing, wherein the base is preferably that part of the electronics housing which is adjacent the stator housing. The plug coupling then can be directed such that it extends normally to the surface of the circuit board, i.e. that its plug-in direction is directed normally to the circuit board. One can then succeed in the second plug connector being directed to the side wall aligned transversely to the base of the electronics housing, i.e. for example an electrical mains connection lead thus being applied onto the electronics housing from the side, due to the arrangement of the plug connector on the connection element at an angle of 90°. The joining direction in inserting the mains connection lead is then parallel to the circuit board.

According to a particular embodiment, the connection element is arranged at a corner of the electronics housing. A good accessibility of the second plug connector from the outside is rendered possible at the corner. According to a further preferred embodiment, the electronics housing, on a wall, i.e. an outer wall comprises an indentation which is directed inwards into the interior and in which the connection element is arranged. I.e. the wall comprises a step and recedes to the interior. Thus, an inwardly directed indentation is created on the wall on the outer side and this indentation forms a space for receiving the connection element. Thus, the connection element can be placed on the outer side of the electronics housing, but despite this can be at least partly situated within the complete outer contour of the electronics housing. Ideally, the connection element does not project beyond the outer contour of the electronics housing, but lies completely in the space formed by the indentation. Thus, the connection element does not compromise the fashioning of the outer contour of the electronics housing, but can merge into this in a harmonic manner.

Further preferably, the indentation on at least one side which is away from the wall delimiting the interior is delimited by a wall, wherein this wall preferably forms an extension of the outer wall of the electronics housing. Thus, the connection element when it is inserted into the indentation is at least partly covered by an extension of the outer wall of the electronics housing, at the outer periphery, so that it is essentially not viewable to the outside at the side of the outer wall. Thus, the connection element merges better into the outer contour or shaping of the electronics housing.

According to a particular embodiment of the invention, the connection element comprises at least one outer surface which merges into an outer wall of the electronics housing in a surfaced manner or connects onto an outer wall of the electronics housing in a surfaced manner, wherein preferably the connection element has a color which is different from the color of the outer wall. Thus, a surface region which is highlighted by a different color is created by the outer surface of the connection element, with the help of the connection element in the outer wall of the electronics housing. This can be advantageous for example for the labelling of the electronics housing if the electronics housing itself has a color, on which this labelling is poorly highlighted. The labeling can then be applied on this outer surface of the connection element designed with a different color. Thus, one can make do without the attachment of an additional label or labelling panel and such is created by the connection element.

An opening, in which the outer surface of the connection element is situated, is formed in the wall which delimits the indentation. Thereby, the outer surface of the connection element preferably lies in the wall such that it merges into the wall in a flush manner to the outer side of the wall, i.e. to the side of the wall which is away from the indentation. The indentation is further preferably formed on the electronics housing such that the wall which delimits the indentation extends transversely, further preferably normally to a base of the indentation. The indentation is open lying opposite the base so that the connection element can be inserted into the indentation from this side. The base of the indentation further preferably corresponds to the base of the electronics housing which is described above. Thus, the wall which delimits the indentation can form part of a side wall of the electronics housing or represent an extension of the side wall extending transversely, further preferably normally to the base of the electronics housing.

The connection element is preferably connected to the electronics housing with a lock-in and/or screw connection. Thus, the connection element can be releasably connected to the electronics housing. A clamping connection or lock-in connection are particularly preferable, so that the connection element can be connected to the electronics housing by way of a pure plug connection, by which means the assembly is simplified.

According to a further preferred embodiment of the invention, a separate stator connection element designed as a plastic shaped part can be arranged on or in the electronics housing, and this stator connection element is connected preferably with a first electrical plug connector to the circuit board in an electrically conductive manner and comprises a second electrical plug connector which is connected to an electrical connection plug of a stator of the electrical drive motor. I.e. this separate stator connection element in the context of a connection element according to the preceding description is designed as a separate component, i.e. it is not an integral component of the structure of the electronics housing and in particular is not manufactured as one part or as one piece with the wall of the electronics housing. In contrast, the connection part is an individual part which is connected to the remaining electronics housing in a suitable manner. The stator connection element serves for the electrical connection of the stator coils to the electronics on the circuit board. For this, the connection element is connected in a suitable manner via a first electrical connection to the circuit board. In particular, this first electrical connection can be realized by a first plug connector which engages into a corresponding plug coupling on the circuit board. Alternatively however, another contacting, for example via a solder connection is also conceivable. The stator connection element comprises a second electrical plug connection which is connected to an electrical connection plug of a stator of the electrical drive motor. This connection plug preferably lies in the inside of the stator housing. It can however also extend out of the stator housing through an opening into the inside of the electronics housing. If it is situated in the inside of the stator housing, preferably the second electric plug connector or a part of the stator connection element extends through an opening in the wall of the electronics housing out of this, into the inside of the stator housing, in order there to contact the electrical connection plug.

The first and the second plug connector on the stator connection element can be designed as a female or male part of a plug connection. Accordingly, the connection plug and the plug coupling on the circuit board are designed in a corresponding manner as a male or female part of the plug connection.

The second electrical plug connector of the stator connection element is connected to the electrical connection elements for connection to the circuit board, in particular to a first electrical plug connector, via strip conductors which are arranged on or in the stator connection element. Preferably, these strip conductors are molded into the inside of the stator connection element. The use of the stator connection element has the advantage that a contacting of the circuit board to the stator in the inside of the stator housing is possible in a simple manner alone by way of plug connections. Thereby, the stator connection element however permits an arrangement of the circuit board in the electronics housing in a manner which is essentially independent of the contacting, since the circuit board does not have to be arranged such that it comes into direct contact with a connection plug or connection element of the stator. Moreover, a cable connection can be done away with. The stator connection element in contrast, as is the case with the previously described connection element, represents an intrinsically stable, preferably rigid plastic component which creates a fixed defined electrical connection as is otherwise formed by the strip conductors molded into the wall of the electronics housing. However, one can make do without the expensive molding process of the electronics housing with molded-in strip conductors.

The first electrical plug connector on the stator connection element is preferably directed oppositely to the second electrical plug connector. I.e. on one side, the stator connection element is contacted with the circuit board via the first electrical plug connector or alternatively via another electrical connection, whereas on the opposite side the second electrical plug connector is situated for connection to the stator. With the use of two plug connectors, their plug-in directions are preferably directed parallel to one another, but in opposite directions.

Particularly preferably, the first plug connector and the second plug connector are arranged offset to one another in a direction transverse to their plug-in directions, whist the plug-in directions are preferably directed parallel to one another. This permits the stator coils to be contacted by the stator connection element at a position which is not covered by the circuit board. Thus, the circuit board does not have to be arranged such that it lies opposite the electrical connection of the stator coils. In contrast, the stator connection element here can create a connection which permits an offset arrangement. With this embodiment too, another suitable electrical connection can be selected instead of a first plug connector, for example first connection elements which are provided for the soldering to corresponding connections on the circuit board can be formed on the stator connection element.

The stator connection element is particularly preferably arranged in the inside of the electronics housing, wherein for example the second plug connector extends through an opening in a base of the electronics housing, to the stator. The base of the electronics housing, thereby, as described above, is preferably the side of the electronics housing which faces the stator. The opening is further preferably sealed in a suitable manner. This for example can be effected by way of the base being sealed with respect to an outer wall of the stator housing. This can be effected for example by way of the base being sealed off with respect to the outer wall of the stator housing. Alternatively, the stator connection element can also be sealed with respect to a wall surrounding the opening.

Particularly preferably, the electronics housing is arranged on the axial end of the stator housing of the electric drive motor, wherein the electronics housing or the terminal box comprises a section which projects radially beyond the outer periphery of the stator housing and on which the connection element is arranged. With regard to this connection element, it is then preferably the case of the mains connection element described above, or another connection element which is provided for the contacting of external electric components or apparatus. The arrangement in the section of the connection element which projects beyond the basic shape of the stator housing has the advantage that here the second plug connector of the connection element can be arranged such that it is well accessible from the outside. Thus, for example a mains connection lead can be applied into this region from the outside, onto the electronics housing or the connection element arranged there.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a lateral view of a pump assembly according to the invention;

FIG. 2 is a lateral view of the pump assembly according to FIG. 1, which is rotated by 90°;

FIG. 3 is a plan view of the pump assembly according to FIGS. 1 and 2;

FIG. 4 is a partly exploded representation of the electronics housing of the pump assembly according to FIGS. 1-3;

FIG. 8 is a view of the opened electronics housing according to FIGS. 4-7, with a removed circuit board;

FIG. 9 is an exploded representation of the electronics housing according to FIG. 8;

FIG. 18 is a sectioned view of the cover according to FIG. 16;

FIG. 19 is an enlarged view showing detail XIX of FIG. 17; and

DESCRIPTION OF THE PREFERRED EMBODIMENTS

Figure 6:
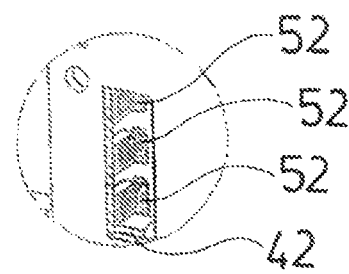
FIG. 6 is an enlarged detail view showing detail VI of FIG. 5.
Figure 5:
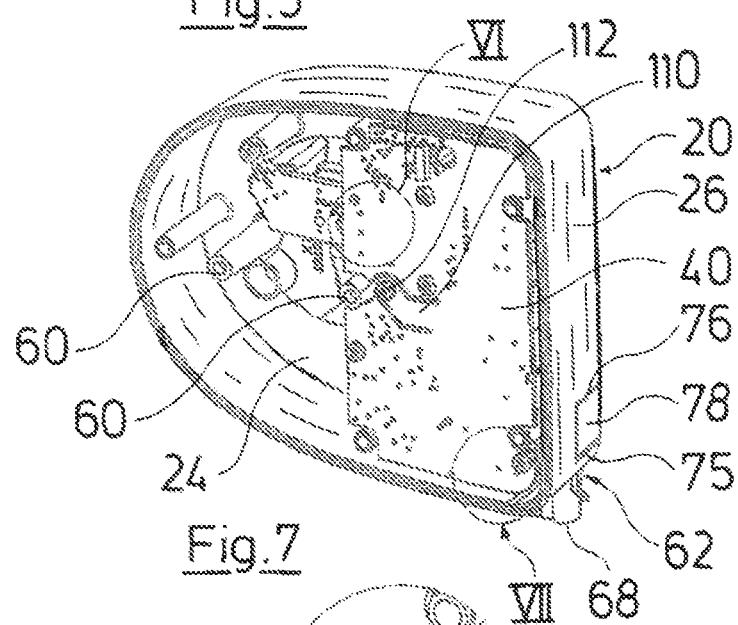
FIG. 5 is a perspective view of the electronics housing according to FIG. 4, in the opened condition.
Figure 7:
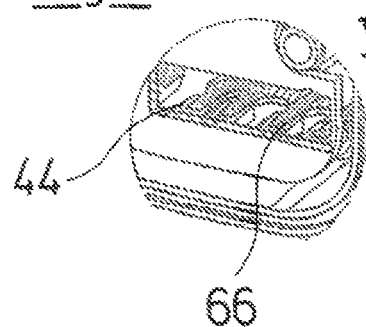
FIG. 7 is an enlarged detail view showing detail VII of FIG. 5.

A first embodiment of the invention is described by way of FIGS. 1-13. Thereby, the FIGS. 1-3, 12 and 13 show the pump assembly according to this preferred embodiment, in an entire view. The pump assembly in the known manner comprises a pump housing 2, in which an impeller 4 is arranged. The pump assembly is thus designed as a centrifugal pump assembly. In the example shown here, the pump housing 2 is surrounded by an insulation element 6. The pump housing 2 is connected to a motor housing or stator housing 8 which connects onto the pump housing 2 in the axial direction in the direction of the longitudinal or rotation axis X. The electric drive motor which in particular comprises a stator 10 and a rotor 12 rotatable in this is arranged in the stator housing 8. The rotor 12 is preferably designed as a permanent-magnetic rotor. The rotor 12 is connected to the impeller 4 in a rotationally fixed manner via the rotor shaft 14. The electrical drive motor is designed as a wet-running electrical drive motor, i.e. it comprises a can 16.

A terminal box or an electronics housing 18 is applied onto the stator housing 8 at the axial end of the stator housing 8 (seen in the direction of the longitudinal axis) which is away from the pump housing 2. The electronics housing 18 is designed as a molded part of plastic, wherein it is designed in a two-part manner and comprises a lower part 20 and a cover 22 applied onto the lower part 20. The lower part 20 is designed in an essentially pot-like manner and comprises a base 24 which faces the stator housing 8. Departing from the base 24, an outer wall 26 extends on the outer periphery of this base, in the axial direction in the direction away from the stator housing 8. Thereby, the outer wall 26 extends essentially in the direction of the longitudinal axis X. The cover 22 for the closure of the electronics housing is applied on the open end of the outer wall 26 which is distanced to the base 24. The base 24 of the electronics housing is screwed to the stator housing 8 via two screws 28. An operating panel 30 with operating and display elements is formed on the outer side of the cover 22.

The electronics housing 18 transversely to the longitudinal axis X has a greater extension than the radial extension of the stator housing 8. Thus, the electronics housing 18 has a section 32 which projects radially or laterally beyond the outer periphery of the stator housing 8. The electronics housing 18 however also slightly projects in the radial direction concentrically to the longitudinal axis X, beyond the outer periphery of the stator housing 8, also in other directions. However, it projects further to one side in the form of the projecting section 32. This region is also widened in the tangential direction in a manner departing from the region at the axial end of the stator housing 8.

The construction of the electronics housing 18 is hereinafter explained in more detail. The cover 22, as shown in FIG. 4, is screwed to the lower part 20 by way of screws 34. In the representation in FIG. 4, the film forming the operating panel 30 is removed from the cover. One can merely recognise openings 36 in the cover 22, which permit the access to the operating elements and display elements arranged on the lower side of the cover which faces the lower part 2. These openings 36 are covered by the film of the operating panel 30 and are closed. Thereby, the film of the operating panel 30 also covers the holes 38, through which the screws 28 for fastening the lower part 20 on the stator housing 8 are led.

A circuit board 40 as an essential element is arranged in the inside of the electronics housing 18, i.e. in the interior which is spanned by the peripheral or outer wall 26 and the base 24 and which is closed by the cover 22. In the known manner, strip conductors are formed on the circuit board 40 and electrical and electronics components for the control or regulation of the drive motor are attached in the stator housing 8. In particular, a frequency converter can be formed on the circuit board.

Figure 10:
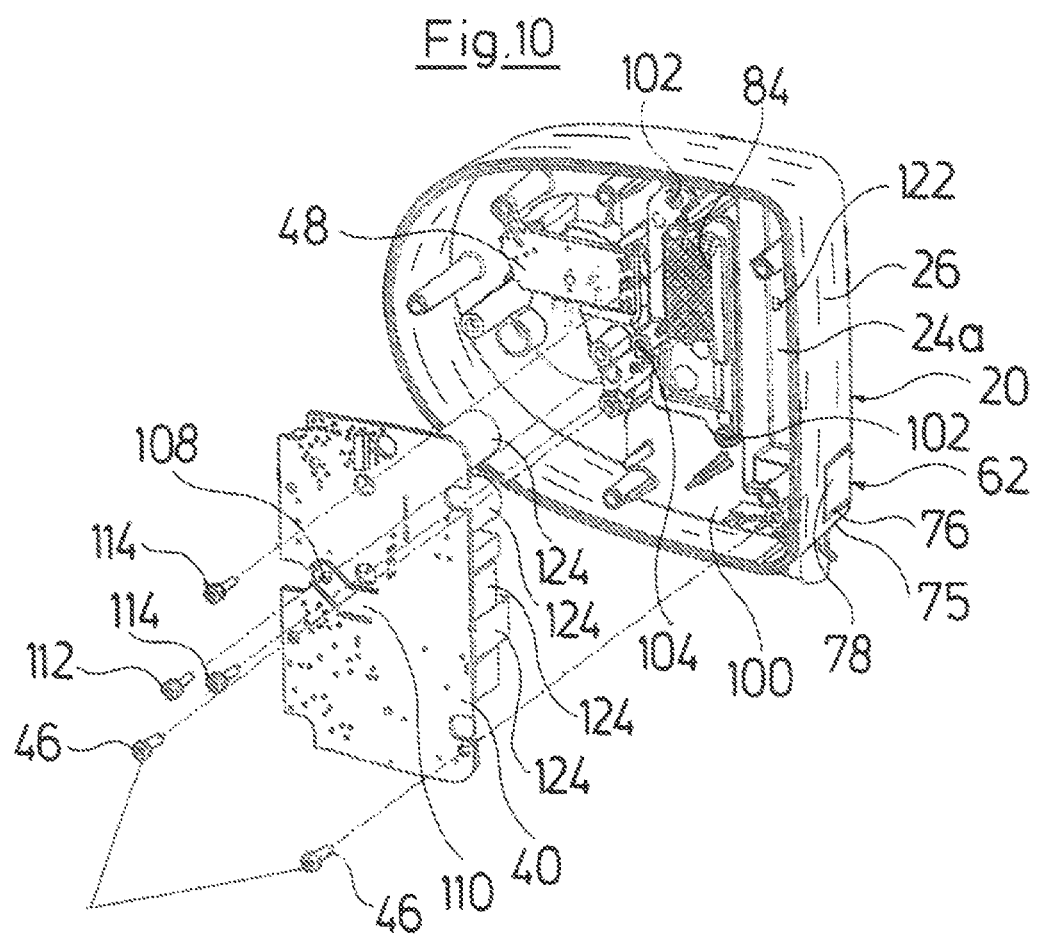
FIG. 10 is an exploded representation of the electronics housing according to FIG. 5.
Figure 11:
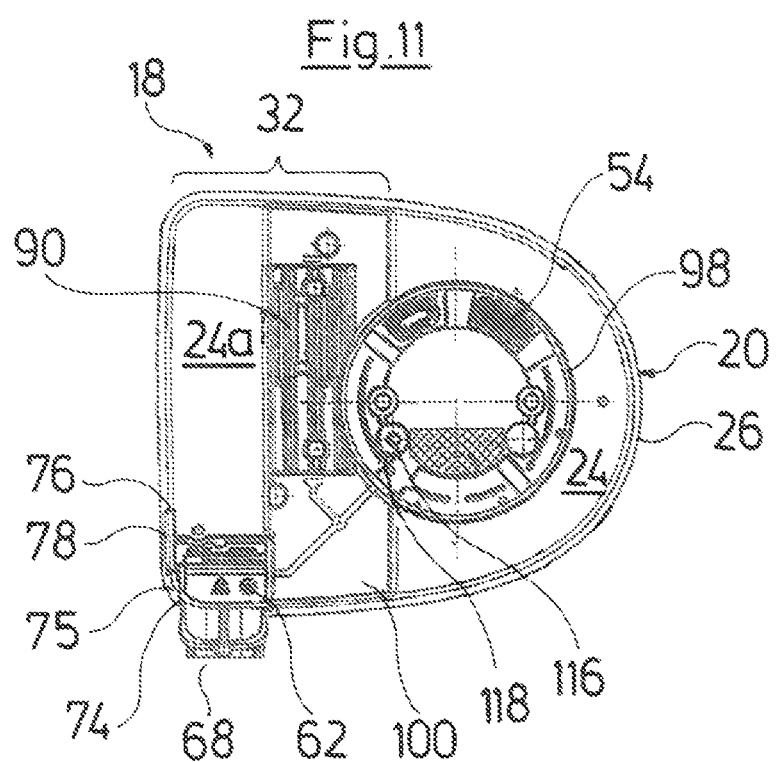
FIG. 11 is a lower side view of the electronics housing according to FIGS. 4-10.
Figure 12:
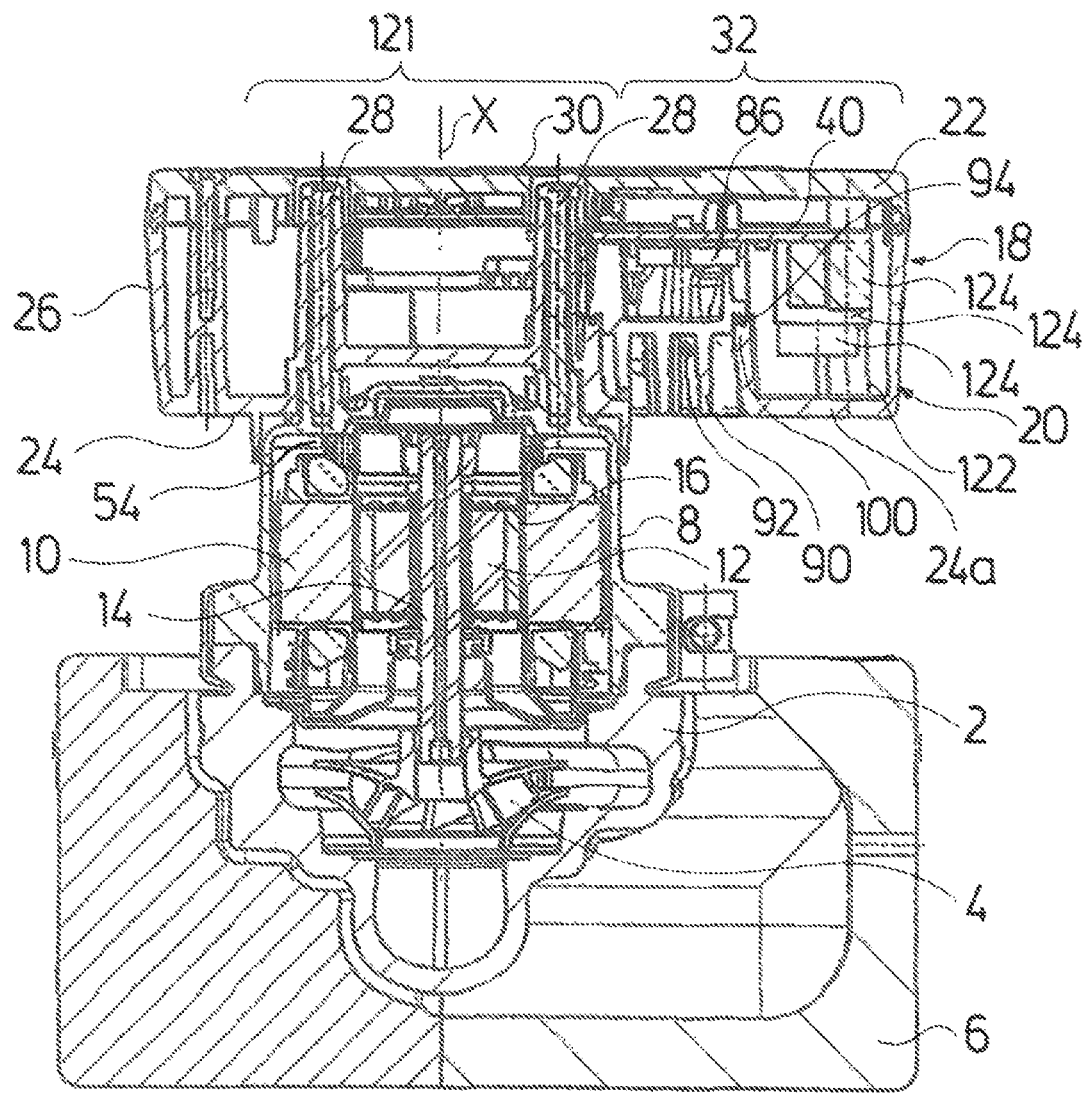
FIG. 12 is a sectioned view of the pump assembly according to FIGS. 1-3.
Figure 13:
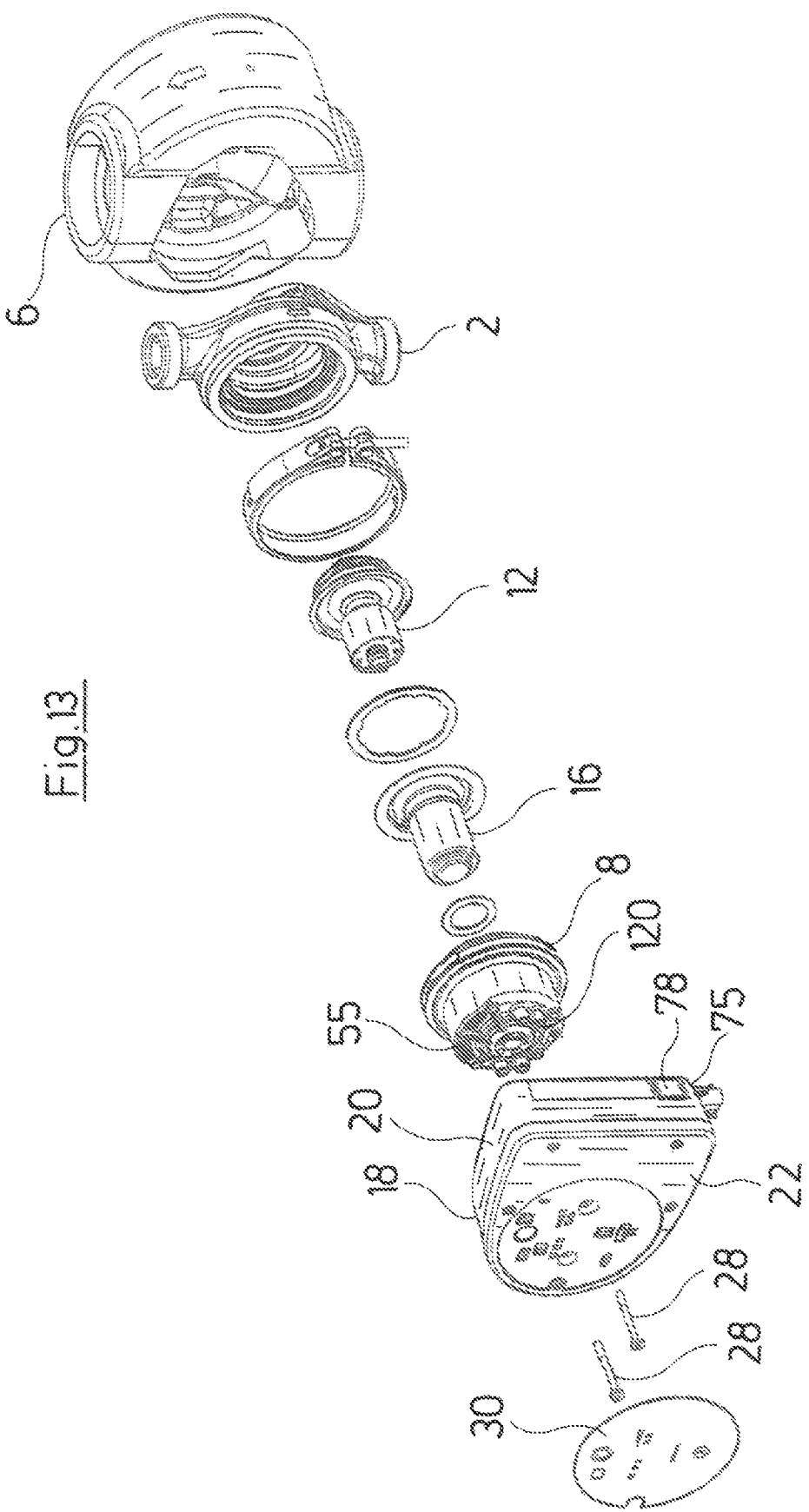
FIG. 13 is an exploded view of the pump assembly according to FIG. 12.
Figure 14:
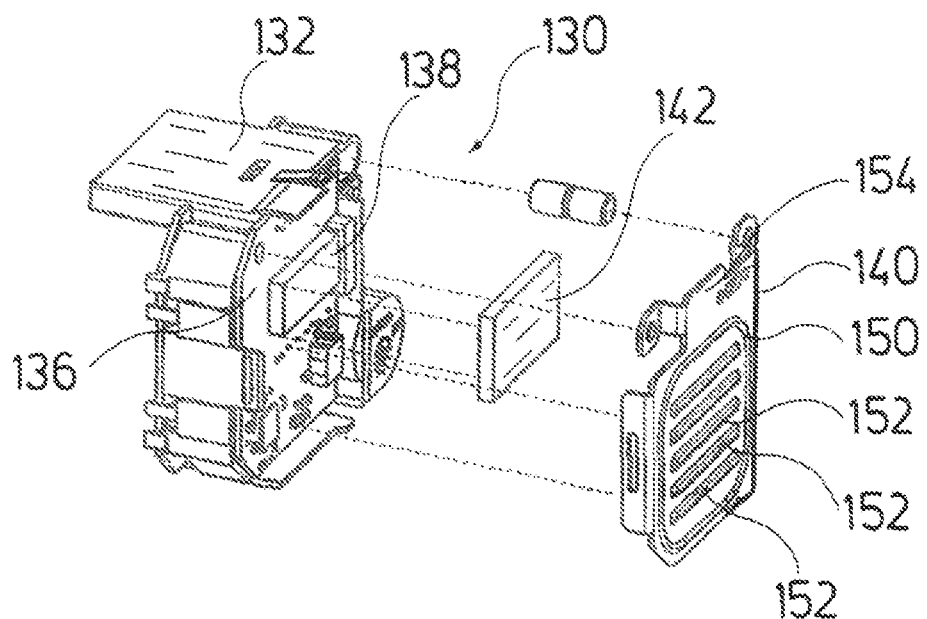
FIG. 14 is a partly exploded representation of an electronics unit of a pump assembly according to a second embodiment of the invention.
Figure 15:
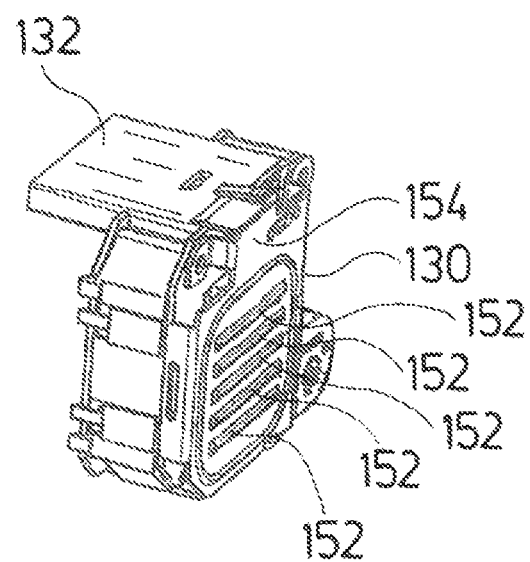
FIG. 15 is a perspective view of the electronics unit according to FIG. 14 in a joined condition.
Figure 16:
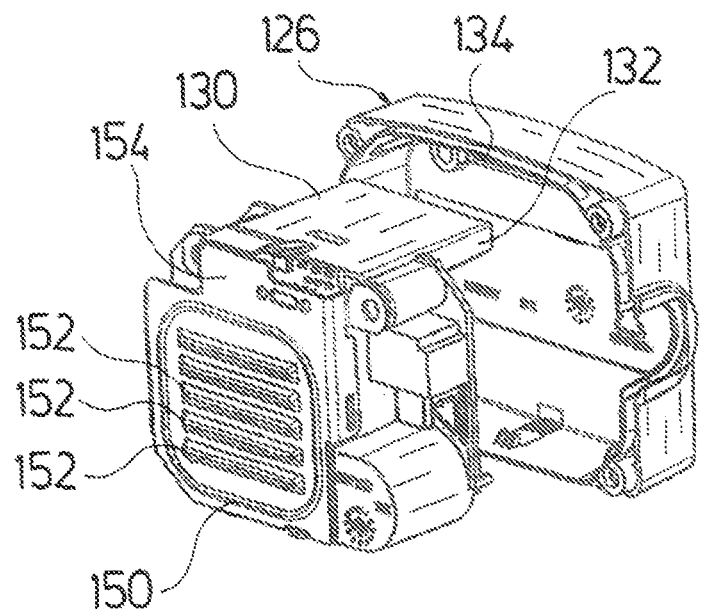
FIG. 16 is a perspective view of the electronics unit according to FIGS. 14 and 15 with the lower part of the electronics housing in an exploded representation.
Figure 17:
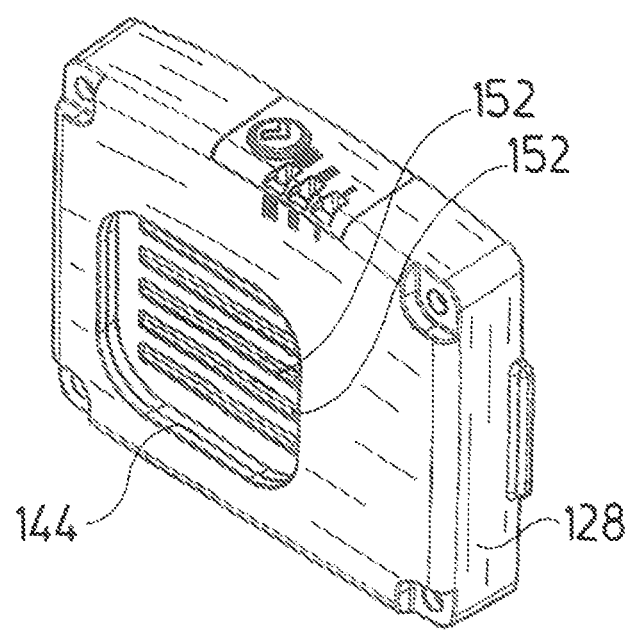
FIG. 17 is a perspective representation of the cover of the electronics housing according to FIG. 15.
Figure 20:
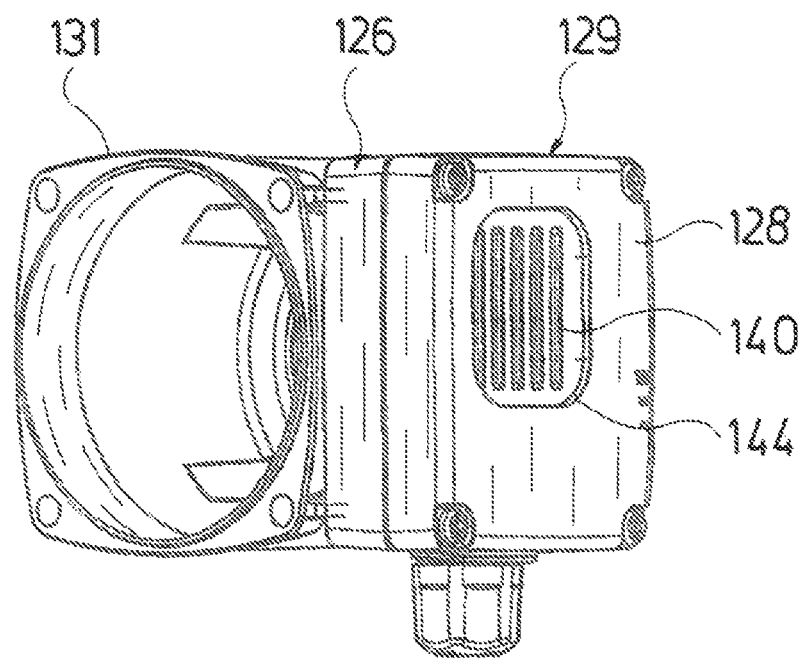
FIG. 20 is a perspective view of the arrangement of the electronics housing of the embodiment according to FIG. 13-19, on a stator housing.

Two plug couplings, a first plug coupling and a second plug coupling 44 are formed on the circuit board 40. The first and the second plug coupling 42 and 44 serve for the connection to connection elements for connection to external components, as is explained in more detail by way of FIGS. 8 and 9. In the representation according to FIGS. 8 and 9, as is shown in FIG. 10, the circuit board 40 is removed from the electronics housing 18. The circuit board 40 is fastened with screws 46, in the lower part 20 of the electronics housing 18. A first connection element which forms a stator connection element 48 serves for the electrical connection of the stator 10 to the electronic and electrical components on the circuit board 40. I.e. the stator 10 here forms the external component. The stator connection element 48 is designed as a separate component which by way of a screw 50 and one of the screws 46 fixing the circuit board 40 in the lower part 20, is screwed on the lower part 20 of the electronics housing 8. The lower part 20 is designed as a purely plastic housing and has no fixedly arranged conductors or strip conductors in its inside, in particular no strip conductors molded into the plastic material. Such are replaced by strip conductors which are formed in the stator connection element 48. The stator connection element 48 is designed as an intrinsically stable shaped part of plastic and comprises a first plug connector 52 and a second plug connector 54. The stator connection element 48 has a flat middle region which extends parallel to the base 24 and the circuit board 40 in the inside of the electronics housing 18. At opposite ends of this middle region, i.e. in a direction transverse to the longitudinal axis X, the first plug connector 52 and the second plug connector 54 are arranged distanced to one another. Moreover, the first plug connector 52 and the second plug connector 54 are directed in the direction of the longitudinal axis X in opposite directions. I.e. the plug directions, in which the plug connectors 52 and 54 are contacted, are aligned essentially parallel but opposite to one another. In the example shown here, the plug connectors 52 and 54 are designed in a three-pole manner and are connected to one another in the inside of the stator connection element 48 via strip conductors 56 which are represented dashed in FIG. 9. The strip conductors 56 are molded into the plastic material so that this simultaneously electrically insulates the strip conductors 56. The second plug connector 54 extends through an opening 58 in the base 24 of the lower part 20 of the terminal box 18 out of the interior of the electronics housing 18 and engages through an opening 55 an the axial side, into the inside of the stator housing and there comes into contact with connection contacts or a connection plug, for contacting the coils in the stator 10. The first plug contact 52 electrically conductively engages with the first plug coupling 42 on the circuit board 40.

As is to be recognized, due to stator connection element 48, it is possible for the circuit board 40 not to have to be situated above the opening 58, but it can be arranged laterally shifted to this in the direction transverse to the longitudinal axis X, in the electronics housing 18. This has the advantage that the region, through which the screws 28 extend through the guides 60 in the lower part 20 in the electronics housing 18, remains free, so that the fastening of the electronics housing 18 on the stator housing 8 is not inhibited by the circuit board 40 in the inside. In contrast to molded-in conductors in the electronics housing, the stator connection element 48 has the advantage that the manufacturing procedure for manufacturing the lower part 20 is simplified, since no strip conductors need to be molded in. Compared to a cable connection, the stator connection element 48 has the advantage that it is shape-stable and thus is positioned in the lower part 20 in a defined manner, so that an unintended clamping and damage of cables cannot occur.

The second plug coupling 44 of the circuit board 40 is connected to the second connection element which is formed on the mains connection element 62. The mains connection element serves for the connection of an external component in the form of a mains connection lead. Whilst the stator connection element 48 is arranged in the inside of the electronics housing 18 and only extends with its second plug connector 54 to the outside out of the electronics housing 18, the mains connection element 62 is arranged on the outside of the electronics housing 18 or its lower part 20. The mains connection element 62 is arranged in an indentation 64 which is formed in the base 24 of the lower part 20. The indentation 64 is directed into the inside of the lower part 20, i.e. in the region of the indentation 64, the base 24 is situated closer to the cover 22 in the axial direction X than the base 24 directly above the stator 8. The indentation 64 thus on the outer side of the lower part 20 creates a receiving space, in which the mains connection element 62 is received such that it does not project beyond the overall outer contour of the electronics housing 18 which is defined by the peripheral or outer wall 26. In particular, the mains connection element 62 does not project in the axial direction X beyond this outer contour.

The mains connection element 62 is designed as a shaped part of plastic with electrical strip conductors which are molded into the plastic material. The electric strip conductors form a first plug connector 66 which comes into electrically conductive engagement with the second plug coupling 44 on the circuit board 40. In this example, the first plug connector 66 and the second plug coupling 44 are designed in a three-poled manner. Thus, two mains conductors and one earth conductor are present. A second plug connector 68 which as a plug coupling is designed for the connection of a mains connection lead which is not shown here, is connected to the first plug connector 66 via the strip conductors in the inside of the mains connection element 62. The first plug connector 66 extends through an opening 70 in the base 24 of the lower part 20 into the inside of the lower part 20 and thus of the electronics housing 18, in order to engage there with the second plug coupling 44 of the circuit board 40. A seal 72 which comes to sealingly bear on the outer side of the base 24 and thus seals the opening 70 to the outside is arranged on the mains connection element 62 in a manner surrounding the first plug connector 66. Alternatively, this seal 72 could also be formed on the base 24 of the lower part 20.

The second plug connector 68 is designed angled by 90° with respect to the first plug contact 66, so that the second plug connector 68 extends towards the peripheral wall 26 or laterally outwards through an opening or recess 74. I.e., the plug directions of the first plug connector 66 and of the second plug connector 68 are directed at an angle of 90° to one another. The recess 74 is situated in a wall 75 which surrounds the indentation 64. This wall 75 represents an axial extension of the outer wall 26 and thus forms a part of the outer wall 26, even if it does not surround the interior of the lower part 20 or of the electronics housing 18. A second recess 76 is formed on an adjacent side surface of the indentation 64, in this wall 75. The indentation 64 is situated at a corner of the lower part 20, so that the recesses 74 and 76 are situated on two walls or wall sections, which are extend essentially at an angle of 90° to one another. If the mains connection part 62 is situated in the indentation 64, an outer surface 78 lies in the recess 76 and closes this, so that the outer surface 78 of the mains connection element 62 merges into the wall 75 or the outer side of the peripheral wall 26 in a harmonic or flush manner. The mains connection element 62 is preferably designed as one piece of plastic. Thereby, the plastic preferably has a color which differs from the color of the surrounding outer wall 26 and thus of the complete lower part 20. This can be advantageous, in order to attach a visible inscription, for example a QR code, which would be poorly readable on the color of the outer wall 26, on the outer surface 78. Thus, one can make do without an inscription panel which is to be additionally attached. This in contrast is provided by the outer surface 78.

The mains connection part 62 is fixed in the indentation 64 by way of a screw 80 which extends from the inside through the base 24 of the lower part 30. I.e. the mains connection element 62 cannot be released from the outer side. Thus, one ensures that the electronics housing 18 remains securely closed in this region. Due to the fact that the mains connection element 62 is arranged in the indentation 64 situated in the projecting section 32 at a corner, the second plug connector 68 extending to the side is well accessible for the connection of the mains connection lead 62. Thereby, the second plug connector 68 is directed parallel to a suction nozzle 82 extending downwards, given a preferred installation position of the pump assembly.

The use of the mains connection element has the advantage that a mains connection lead does not need to be connected directly to the circuit board 40 or to the electrical conductors which are arranged there. Thus, for the connection of the mains connection lead, it is not necessary to open the electronics housing 18, by which means an unintended damage to electrical or electronic components in the inside can be prevented on connection of a mains connection lead. The arrangement of the mains connection element 62 on the outside moreover has the advantage that the opening 70 in the base 24 can be well sealed from the outside, so that a penetration of moisture can be prevented in this region. Moreover, the mains connection element 62 could assume an adapter function, with which different second plug connectors 68 are provided, in order to be able to connect differently shaped counter-pieces of mains connection leads here. Thus, an adaptation of the electronics housing 18 to different connection leads can be realized, without having to change the essential components such as the circuit board 40. Moreover, one can make do without strip conductors arranged in the lower part 20 and thus the electronics housing 18, also in the region of the mains connection.

Furthermore, a heat distributor 84 is arranged in the lower part 20 and serves for the cooling of heat-producing electronic components on the circuit board 40. Such an electronic component 86 can for example be the power switch of a frequency converter. With the arrangement selected here, the electronic component 86 to be cooled is situated on the side of the circuit board 40 which faces the base 24. The component 86 to be cooled bears on the contact surface 88 on the heat distributor 84 in a thermally conductive manner. The contact surface 88 extends essentially parallel to the base 24 and to the circuit board 40, i.e. normally to the longitudinal axis or rotational axis X. The heat distributor 84 is designed as a cast component of metal, for example aluminum and on its axial side which is away from the contact surface 88 comprises a rib structure 90. The heat distributor 84 is arranged in the inside of the electronics housing 18 or its lower part 20, such that it extends outwards through a recess or opening 92 in the base 24 of the electronics housing 18, in a manner such that the rib structure 90 is situated on the outer side of the lower part 20, whilst the contact surface 88 is situated in the inside. A seal 94 is arranged on the peripheral region of the opening 92 and comes to sealingly bear on the corresponding contact surface on the heat distributor 84, so that the heat distributor 84 sealingly closes the opening 92. The seal 94 is usefully molded directly onto the lower part 20 with two-component injection molding. Thus, the seal 94 can be molded simultaneously with further seals 96 and 98, which serve for sealing the cover 22 as well as the base 24, with respect to the axial end of the stator housing 8.

The base 24 of the lower part 20 comprises a step 100 in the region of the opening 92. The step 100 projects into the inside of the electronics housing 18. Thus, the step 100 forms an inwardly directed indentation and has the effect that the opening 92 is situated closer to the circuit board 40 in the axial direction, than the remaining region of the base 24. Thus, the opening 92 and thus the contact surface 88 of the heat distributor 64 inserted into the opening can be brought into the proximity of the circuit board 40, in order there to be brought directly into contact with the electronic component 86 to be cooled. Simultaneously, an indentation or a receiving space is created on the outside of the opening 92, i.e. on the outer side or lower side of the lower part 20 which faces the stator housing 8, in the region of the step 100, wherein the outer part of the heat distributor, specifically the rib structure 90 has space in this indentation or receiving space. Thus, one succeeds in the rib structure 90 although lying outside the electronics housing 18, however lying within the outer contour of the electronics housing which is defined by the outer wall 26. In particular, the rib structure 90 in the axial direction does not project beyond the base 24 of the electronics housing 18 which is adjacent the stator housing 8. The rib structure 90 thereby lies further laterally or to the radial side, of the outer periphery of the stator housing 8 in the projecting section 32, so that air can freely flow over it at the lower side of the electronics housing 18 which faces the stator housing 8. The opening 92, through which the heat distributor 84 extends outwards with its rib structure 90, thus lies in a region which does not face the stator housing. Although the base 24 basically faces the axial end of the stator housing 8, the base however in the projecting section 32 does not face the stator housing 8, but faces a region at the radial side of the stator housing, i.e. outside the stator housing. Thus, the opening 92 with the heat distributor 84 lies in a region of the electronics housing 18 which is away from the stator housing 8. The cooling of the rib structure 90 via the surrounding air is further encouraged due to the fact that the rib structure 90 is not covered by housing parts. Simultaneously, the upper side of the electronics housing 18, i.e. of the cover 22, on which the operating panel 30 is situated, is kept free of components leading away heat. Thus, the heat distributor 84 is essentially not visible from the operating side, so that it does not upset the optical impression of the electronics housing 18.

The heat distributor 84 is fastened in the lower part 20 via two screws 102. Moreover, the heat distributor 88 is connected to an earth terminal of an earth connection in the stator connection element 48. The earth connection in the stator connection element 48 is likewise designed as a molded-in strip conductor 56 which ends at an eyelet-like or annular earth terminal 104. The annular earth terminal 104 comes to lie in the heat distributor 84 via a threaded hole 106, when assembling the stator connection element 48. An earth contact 108 of the circuit board 40 comes to lie above the annular earth terminal 108, away from the threaded hole 106. The earth contact is formed by a strip conductor surrounding a hole and is situated on a tongue-like section 110. The tongue-like section 110 is formed in the circuit board by way of cuts. A screw 112 extends through the hole of the earth contact 102 on the tongue-like section 110 and through the earth terminal 104, into the threaded hole 106. Thus, an earth connection is created between an earth lead formed on the circuit board 40 simultaneously with the earth terminal 104 of the stator connection element 48, and the heat distributor 84. The earth conductor formed on the circuit board 40 is connected via the plug coupling 44 to a corresponding earth contact of the plug connector 66 of the mains connection element 62 and via this to the earth conductor of a mains connection lead.

The arrangement of the earth contact 108 on the tongue-like section 110 has the advantage that with this, the earth contact 108 can be moved together with the tongue-like section 110 with respect to the remaining parts of the circuit board 40. Thus, one prevents stresses being introduced into the circuit board 40 due to the connection of the earth contact 108 to the heat distributor 84 and the stator connection element 48, wherein these stresses can lead to a tearing of strip conductors on the circuit board 40.

Moreover, with this design, the contact between the heat distributor 84 and the earth terminal 104 on the stator connection element 48 is dimensioned such that a heat-conducting connection as is also created apart from an electrically conductive connection. For this, the contact surface between the heat distributor 84 and the earth terminal 104 can be designed larger than is necessary for the electric contact. On account of this, one succeeds in the heat distributor being able to heat the earth terminal 104 and the strip conductor connecting thereto, in the inside of the stator connection element 48. This has the advantage that the strip conductor and the earth terminal 104 in the inside of the electronics housing 18 cannot cool down via a contact with the stator housing 8, as is described hereinafter, which could lead to a condensation of moisture in the electronics housing 18. Such a cooling for example would be feared if the pump assembly were to be applied as a cold water pump, with which a cooling of the stator housing 8 occurs.

Moreover, the electronic component 86 is fixed on the contact surface 88 of the heat distributor 84 via two screws 114.

The stator connection element 48 at its earth connection moreover comprises a further earth terminal 116. This comes to lie above an opening 118 in the base 24 of the lower part 20. A pin 120 which is arranged at the axial end of the stator housing 8 can extend through the opening 118, into the inside of the electronics housing 18 and engage into the earth terminal 116. The pin 120 at the axial side of the stator housing 8 is electrically conductively connected to this and projects in the axial direction X. Spring plates or spring tongues are formed in the earth terminal 116 and come into electrically conductive and cutting engagement with the outer periphery of the pin 120. Thus, an earth connection is created between the metallic stator housing 8 and the earth connection in the stator connection element 48. The earthing then via the stator connection element 48 and its second earth terminal 104, is then effected via the earth conductor on the circuit board 40 and as described, the mains connection element 62.

The described step 100 in the base 24 of the lower part 20 is situated in the projecting section 32 in a manner adjacent to the middle region 121 of the lower part 20 which is applied onto the axial end of the stator housing 8 and is designed in a strip-like manner in the tangential direction. I.e. a region 24a of the base 24 is formed on the radially outer section and projects via the step 100 again in the axial direction to the stator housing 8 and is situated on the same axial level as the remaining region of the base 24 outside the step 10. Thus, a receiving space 122 which has a greater axial height is created in the interior of the lower part 20 in a manner adjacent the step 100. I.e. the axial height between the circuit board 40 and the base 24, 24a, in the region of the receiving space 122 is greater than between the circuit board 40 and the step 100 in the inside of the electronics housing 18. Thus, those electronic components 124 which have a greater axial construction height can project into the receiving space 122. Thus, on account of the design of the step 100 in the base 24 if the electronics housing 18 with the receiving space 122 situated laterally of the step, on the one hand one can succeed in the heat-dissipating electrical component 86 which is to be cooled being able to be arranged in the axial direction in the proximity of the opening 92, through which the heat distributor 84 projects outwards, but simultaneously a greater axial free space for receiving higher electronic components 124 being given laterally but above the circuit board 40, in the receiving space 22. This permits all electronic components to be arranged on a plane circuit board 40 and moreover to design a flat electronics housing 18 which is essentially disk-like in its overall contour and beyond which no components such as a heat distributor 84 project in the axial direction. The indentation 64, in which the mains connection element 62 is situated, as is the case with the receiving space 122, is situated at the side of the step 100 which is away from the longitude axis X. The indentation 64 is thereby connected to the free space which is formed by the step 100 on the outer side of the base 24 and in which the rib structure 90 is situated.

A further possible arrangement according to the invention, of a heat distributor in an electronics housing of a pump assembly is described by way of FIGS. 14-20. The electronics housing shown here consists of a lower part 126 and of a cover 128 which are screwed to one another. The thus formed electronics housing 129 is designed for application onto a stator housing 131, wherein the electronics housing 129 is applied onto the stator housing 131 on the peripheral side, i.e. on the radial side. Accordingly, the electronics housing could however also be applied onto a stator housing on the axial side, as previously described. The lower part 126 of the shown electronics housing 129 is connected to the stator housing 131. An electronics unit 130 is arranged in the inside of the electronics housing 129 formed from the lower part 126 and the cover 128 and comprises electronics components for the control or regulation of an electric drive motor of the pump assembly, for example a frequency converter. The electronics unit 130 comprises a connection plug 132 which extends outwards through an opening 134 in the base of the lower part 26 out of the electronics housing and is envisaged for contacting with a corresponding counter-connection-plug in the stator housing.

The electronics unit comprises a circuit board 136, on which at least one heat-producing component 138, for example the power switch of a frequency converter is arranged. Moreover, a heat distributor 140 is arranged in the inside of the electronics housing. The heat distributor 140 is designed as a formed part of sheet metal and is in thermally conductive connection with the heat-producing electronic component 138 via a thermally conductive cushion 142. It is to be understood that another thermally conductive connection can be created between the heat distributor 140 and the electronic component 138 instead of the thermally conductive cushion 142, for example via a thermally conductive paste or also by way of direct contact.

The heat distributor 140 is situated in the inside of the electronics housing 129, i.e. below the cover 128. The cover 128 comprises an opening 144. The heat distributor 140 is situated in the inside of the electronics housing 129 below the opening 144, so that it closes the opening 144. For this, a seal 148, on which the heat distributor 140 comes to sealingly bear with a projection 150 is arranged between the heat distributor 140 and the wall 146 surrounding the opening 144. Thus, the heat distributor 140 sealingly closes the opening 144 to the outside. The opening 144 is situated in the cover 128 which is away from the stator housing 131, since the lower part 126 is provided for connection to the stator housing 131. Thus, with this arrangement, the heat distributor 140 is arranged in the opening 144 in a region of the electronics housing 129 which is away from the stator housing.

Corrugations 152 are formed in the part of the heat distributor 140 which is situated in the opening 144. The projection 150 and the corrugations 152 are formed by way of embossing the sheet metal component, from which the heat distributor 140 is manufactured, and is directed projecting outwards to the opening 144. The corrugations 152 enlarge the surface of the heat distributor 140 in the region of the opening 144 and thus improve the leading away of heat in this region. The heat distributor 140 in the region of the opening 144 to the outside is not covered by further components and does not project outwards in the axial direction beyond the outer side or front side of the cover 128, i.e. beyond the outer peripheral edge of the opening 144.

The electronic component 138 bears on the heat distributor 140 in a region 154 which is designed in a plane manner and is situated outside the opening 144, i.e. laterally of the opening 144 in the direction of the surface of the cover 128. This has the advantage that the region 154 can be designed in a plane manner without corrugations 152, so that a good thermal transition from the electronic component 138 via the thermally conductive cushion 142 onto the region 154 of the heat distributor 140 can be achieved. Simultaneously, the part of the heat distributor 140 which is situated in the opening 144 and over which air flows can be designed in a structured manner on account of the corrugations 152, in order to achieve a greater surface for an improved cooling.

While specific embodiments of the invention have been shown and described in detail to illustrate the application of the principles of the invention, it will be understood that the invention may be embodied otherwise without departing from such principles.

The invention claimed is:

1. A pump assembly comprising:
   a stator housing;
   an electrical drive motor arranged in the stator housing;
   an electronics housing connected to the stator housing, the electronics housing having a wall delimiting an electronics housing interior and having an opening formed in the wall;
   at least one circuit board comprising a first electrical plug coupling and a second electrical plug coupling and electronic components, the at least one circuit board being arranged in the interior of the electronics housing;
   a separate power connection element configured as a plastic shaped part not integral with the electronics housing, the separate power connection element being arranged on the electronics housing, said separate power connection element comprising a first electrical plug connector and a second electrical plug connector, the first electrical plug connector being connected to and disconnectable from the second electrical plug coupling on the circuit board, wherein the second electrical plug connector is connected to the first electrical plug connector via electrical strip conductors and the second electrical plug connector defines a power connection lead connection that serves for an electrical connection of a component situated at an exterior of the electronics housing; and
   a fixing means for releasably fixing the separate power connection element to the electronics housing and for releasing the separate power connection element from the electronics housing such that the separate power connection element is removeable and replaceable, wherein:
   the fixing means mounts the plastic shaped part of the separate power connection element to the exterior of the electronics housing with the first electrical plug connector extending through the opening into the electronics housing interior and with the second electrical plug connector arranged outside the electronics housing interior.

2. A pump assembly according to claim 1, further comprising a seal, wherein
   the seal sealingly bears on the wall and surrounds the opening; and
   the seal bears on the separate power connection element; and
   the seal is molded onto the wall or is molded onto the separate power connection element.

3. A pump assembly according to claim 1, wherein the first and the second electrical plug connector are arranged angled relative to one another, at an angle of 90° to one another.

4. A pump assembly according to claim 3, wherein the at least one circuit board, in the interior of the electronics housing, extends parallel to a base defined by said wall of the electronics housing, and the second electrical plug connector is directed to a side wall of the electronics housing, wherein the side wall extends transversely to the base.

5. A pump assembly according to claim 1, wherein the separate power connection element is arranged at a corner of the electronics housing.

6. A pump assembly according to claim 1, wherein the wall of the electronics housing comprises an indentation directed inwardly into the interior in which the first electrical plug connector of the separate power connection element is arranged.

7. A pump assembly according to claim 6, wherein:
the indentation is at a side of the electronics housing which is spaced apart from the wall delimiting the electronics housing interior; and
the indentation delimiting wall forms an extension of an outer wall of the electronics housing.

8. A pump assembly according to claim 7, wherein the separate power connection element comprises at least one outer surface which merges into the outer wall of the electronics housing or connects to the wall of the electronics housing in a surfaced manner, wherein the separate power connection element has a color which is different from a color of the outer wall.

9. A pump assembly according to claim 6, wherein an outer surface of the separate power connection element is situated in the opening and the opening is at least partially formed in the wall delimiting the indentation.

10. A pump assembly according to claim 1, wherein the fixing means comprises at least one of a non-positive fit, a positive fit, a lock-in connection and a screw connection between the separate power connection element and the electronics housing, whereby the separate power connection element is attached to the housing from the exterior and secured to the housing from electronics housing interior.

11. A pump assembly according to claim 1, further comprising a separate stator connection element formed as a plastic shaped part arranged on or in the electronics housing, said separate stator connection element comprising a stator connection element electrical plug connector electrically conductively connected to the first electrical plug coupling of the circuit board and another stator connection element electrical plug connector, which is connected to an electrical connection plug of a stator of the electrical drive motor.

12. A pump assembly according to claim 11, wherein the stator connection element electrical plug connector is directed opposite to said another stator electrical plug connector.

13. A pump assembly according to claim 11, wherein:
the stator connection element electrical plug connector and the another stator electrical plug connector are arranged offset to one another in a direction transverse to respective plug-in directions; and
the plug-in directions are directed parallel to one another.

14. A pump assembly according to claim 11, wherein:
the separate stator connection element is arranged partially in the inside of the electronics housing; and
the another stator plug connector extends through an opening in a base of the electronics housing, to the stator.

15. A pump assembly according to claim 1, wherein:
the electronics housing is arranged on an axial end of the stator housing of the electrical drive motor; and the electronics housing comprises a section which projects radially beyond the outer periphery of the stator housing and on which the connection element is arranged.

16. A pump assembly comprising:
a stator housing;
an electrical drive motor arranged in the stator housing;
an electronics housing with a base wall and an outer peripheral wall and an open end and with a cover closing the open end, the electronics housing defining an interior with one of the base wall and the outer peripheral wall or both the base wall and the outer peripheral wall defining a power connection opening;
a circuit board and electronic components arranged in the interior of the electronics housing, the circuit board having a first electrical plug coupling formed thereon and the circuit board having a second electrical plug coupling formed thereon;
a circuit board connection element fixing means configured to releasably fix the circuit board directly to the electronics housing;
a power connection element configured as a separate plastic shaped part not integral with the electronics housing and not integral with the circuit board, the power connection element comprising electrical strip conductors, a circuit board plug connector connected to the electrical strip conductors and connected to and disconnectable from the first electrical plug coupling on the circuit board and an external electrical plug connector connected to the electrical strip conductors and forming an external electrical connection for connection of a component situated outside the electronics housing; and
a power connection element fixing means configured to releasably fix the power connection element directly to the electronics housing and to release the power connection element from the electronics housing, the power connection element fixing means comprising at least one of a non-positive fit, a positive fit, a lock-in connection and a screw connection between the power connection element and the electronics housing such that the power connection element is removeable and replaceable, wherein:
the power connection element fixing means mounts the plastic shaped part of the power connection element to the exterior of the electronics housing with the power connection element coming into contact with an exterior of one of the walls of the electronics housing and with the circuit board plug connector extending through the power connection opening into the electronics housing interior and with the external electrical plug connector arranged outside the electronics housing interior.

17. A pump assembly according to claim 16, further comprising a separate stator connection element formed as a plastic shaped part arranged at least partially in the electronics housing, said separate stator connection element comprising a stator connection element first electrical plug connector electrically conductively connected to the second electrical plug coupling on the circuit board and comprising a stator connection element second electrical plug connector connected to an electrical connection plug of a stator of the electrical drive motor arranged in the stator housing.

18. A pump assembly according to claim 17, wherein:
the stator connection element second electrical plug connector on the separate stator connection element is directed opposite to the stator connection element first electrical plug connector on the stator connection element and is offset from the stator connection element first electrical plug connector in a direction transverse to a respective plug-in directions thereof; and the plug-in directions of the stator connection element first electrical plug connector and the stator connection element second electrical plug connector are directed parallel to one another.

19. A pump assembly according to claim 17, wherein:

an indentation directed inwardly into the interior is provided by an indentation delimiting wall forming an extension of one of the base wall and the outer peripheral wall or both the base wall and the outer peripheral wall defining the power connection opening in which the power connection element is arranged; and the power connection element comprises at least one outer surface which merges into one of the base wall and the outer peripheral wall or both the base wall and the outer peripheral wall as a continuation surface, wherein the connection element has a color which is different from a color of the outer peripheral wall.

20. A pump assembly according to claim 19, wherein:

the circuit board, in the interior of the electronics housing, extends parallel to the base wall of the electronics housing, and at least a portion of the external electrical plug connector extends through the peripheral wall of the electronics housing, which peripheral wall extends transversely to the base wall; and the power connection element is arranged at a corner of the electronics housing.

* * * * *